(12) United States Patent
Dawson

(10) Patent No.: US 7,600,370 B2
(45) Date of Patent: Oct. 13, 2009

(54) FLUID FLOW DISTRIBUTOR APPARATUS FOR GAS TURBINE ENGINE MID-FRAME SECTION

(75) Inventor: Robert W. Dawson, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 489 days.

(21) Appl. No.: 11/440,820

(22) Filed: May 25, 2006

(65) Prior Publication Data

US 2007/0271923 A1    Nov. 29, 2007

(51) Int. Cl.
F02C 3/00       (2006.01)
F23R 3/26      (2006.01)
F23R 3/46      (2006.01)

(52) U.S. Cl. .................. 60/39.37; 60/751; 60/752

(58) Field of Classification Search ............ 60/39.37, 60/751, 752, 760
See application file for complete search history.

(56) References Cited

U.S. PATENT DOCUMENTS

| 2,541,170 | A | * | 2/1951 | Mayers et al. ............... 60/751 |
| 4,244,178 | A | | 1/1981 | Herman et al. |
| 4,297,842 | A | * | 11/1981 | Gerhold et al. .............. 60/760 |
| 4,297,843 | A | | 11/1981 | Sato et al. |
| 4,627,233 | A | | 12/1986 | Baran, Jr. |
| 5,134,855 | A | | 8/1992 | Belcher et al. |
| 5,335,501 | A | | 8/1994 | Taylor |
| 5,353,586 | A | | 10/1994 | Taylor et al. |
| 5,373,695 | A | | 12/1994 | Aigner et al. |
| 5,603,604 | A | * | 2/1997 | Norris et al. ............. 415/208.1 |
| 5,697,209 | A | * | 12/1997 | Wettstein ..................... 60/751 |
| 5,737,915 | A | | 4/1998 | Lin et al. |
| 6,164,058 | A | | 12/2000 | Dobbeling et al. |
| 6,279,322 | B1 | | 8/2001 | Moussa |
| 6,481,209 | B1 | | 11/2002 | Johnson et al. |
| 6,554,569 | B2 | | 4/2003 | Decker et al. |
| 6,672,070 | B2 | | 1/2004 | Bland et al. |
| 6,758,045 | B2 | | 7/2004 | Dimov et al. |
| 7,137,241 | B2 | * | 11/2006 | Martling et al. ............ 60/39.37 |

FOREIGN PATENT DOCUMENTS

JP    55-164731 A    * 12/1980
JP    8-210152        * 8/1986

* cited by examiner

*Primary Examiner*—Ted Kim

(57) ABSTRACT

A plenum (210) in a gas turbine engine mid-frame section (200) comprises one or more annular flow splitters (240) spaced from an inboard annular wall (232) that partition air flow flowing from a compressor into two or more portions of flow having different vectors. This provides for an improved balancing between supplying air to compression chamber intakes more directly and to transitions to aid in convective cooling. When an annular diffuser (202) is spaced between the compressor and the plenum (210), the flow splitters (240) may provide an additional diffusion action. When no annular diffuser is so provided, the flow splitters (452, 454, 456) are effective to diffuse the air flow. Embodiments include those in which an annular diffuser (304) is relatively shorter and there is a longer axial expanse in the plenum (320) for flow splitters (350, 352, 354, 356).

18 Claims, 5 Drawing Sheets

FLUID FLOW DISTRIBUTOR APPARATUS FOR GAS TURBINE ENGINE MID-FRAME SECTION

FIELD OF THE INVENTION

The invention generally relates to a gas turbine engine, and more particularly to the mid-frame section of such an engine including a diffusion zone.

BACKGROUND OF THE INVENTION

In gas turbine engines, air is compressed at an initial stage, then is heated in combustion chambers, and the hot gas so produced drives a turbine that does work, including rotating the air compressor.

To achieve a good overall efficiency in a gas turbine engine, one consideration is the reduction of losses of fluid pressure, such as due to friction and turbulence, between the compressor and the intakes of the combustion chambers. In a common gas turbine engine design, compressed air flows from the compressor, through an annular diffuser, into a plenum in which are positioned transitions and other components, and then from the plenum into the intakes of combustion chambers.

Generally, a diffuser converts a high velocity, low pressure fluid flow into a low velocity, higher pressure fluid flow. That is, a diffuser's efficiency is measured in terms of conversion of dynamic head (i.e., velocity) to static pressure. In a gas turbine engine, the annular diffusers that convey compressed air from the compressor into the plenum typically comprise an annular diverging passage. This diverging from intake end to aft end acts to decelerate the fluid flow from the compressor, and to raise the static pressure by converting its kinetic energy into pressure energy. Among other effects, this approach provides for the fluid to enter the combustion chambers at a velocity providing for sustained combustion.

However, when fluid enters the plenum from the diffuser during operation, it may have dual roles—to pass to the combustion chamber with minimal pressure loss, and to provide cooling to the transitions disposed in the plenum. Design optimization for conversion of dynamic pressure to static pressure may not provide for overall optimization when other functional objectives, such as efficient cooling of the transitions, are taken into account. That is, optimizing the annular diffuser to provide the most efficient conversion without considering alternatives that would more efficiently cool the transitions may not provide the most efficient overall gas turbine engine.

One general approach to improve fluid flow efficiency in the plenum, and thereby improve overall efficiency, is to modify the end of the diffuser so as to redirect fluid flow toward a more radially outward direction. For example, a curved diffuser may be employed wherein the aft end has a bend that directs the fluid flow radially outward, instead of axially aft. Conceptually this may provide 1) a more direct, flow-efficient route to the combustion chamber intakes, and 2) less turbulence/frictional losses in the parts of the plenum where the mid-sections and aft ends of the transitions are located. Another, different approach, is the use of radially offset splitters within the diffuser, such as described in U.S. Pat. No. 5,737,915, U.S. Pat. No. 5,335,501, or in U.S. Pat. No. 5,134,855, or a diffuser with radially extending struts (dividers) and/or annular flow separators, as disclosed in U.S. Pat. No. 6,554,569 (see FIG. 8 and accompanying text).

However, radial diversion of a substantial portion of compressed fluid from an annular diffuser, without more, may not effectively provide a desired resolution when the fluid flow from the compressor is desired to be used to cool the transitions. Particularly, when there is a relatively long expanse of transition disposed aft of a radially split annular diffuser, given the tendency of fluid flow from such diffuser to deviate radially and forward, toward the combustion chambers' intakes, such an approach does not provide a balanced cooling fluid flow across the length of such transition. This may necessitate implementation of transition cooling approaches that are relatively costly on a capital and/or an operational basis.

Further as to such approaches, generally it is known that cooling transitions with fluid flow from the compressor may be implemented by direct convection cooling (i.e., directing the fluid flow across the outside surface of the transitions, see for one example U.S. Pat. No. 4,903,477), by open fluid cooling (in which a portion of the compressed fluid passes through channels in the transition and then enters the flow of combusted gases within the transition, see for one example U.S. Pat. No. 3,652,181), by channel cooling (i.e., conveying fluid from outside the transition, through channels in the transition walls, and into the transition), by impingement cooling (where fluid is directed at the transition exterior walls through apertures positioned on plates or other structures close to these walls, see U.S. Pat. No. 4,719,748 for one example), and by combinations of these approaches.

BRIEF DESCRIPTION OF THE DRAWINGS

The invention is explained in following description in view of the drawings that show.

DETAILED DESCRIPTION OF THE INVENTION

Figure 1A:
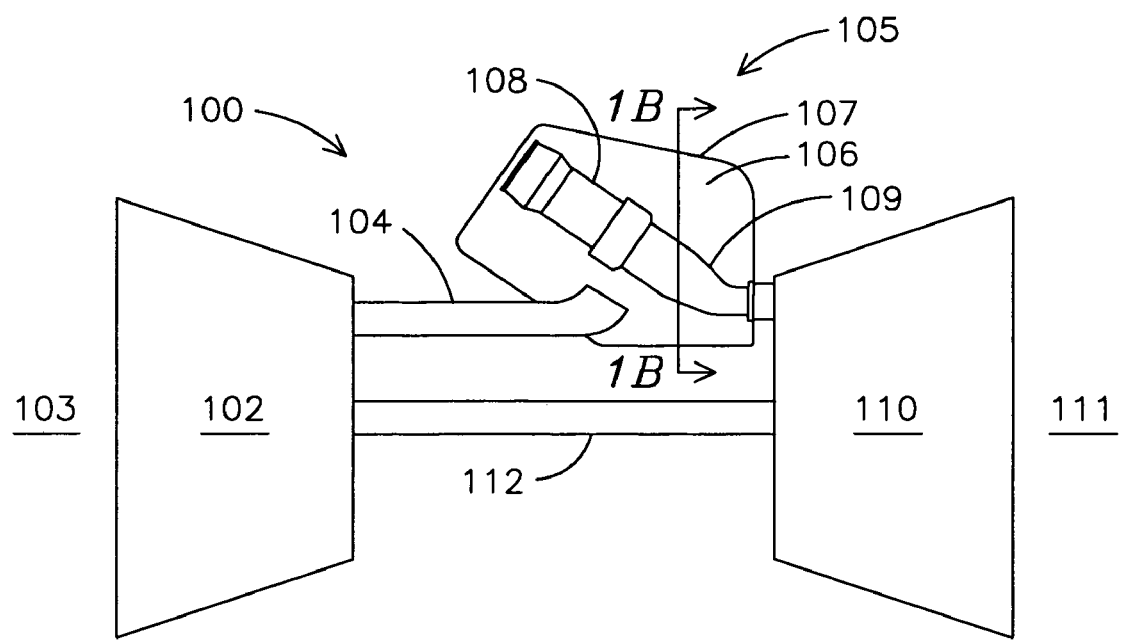
FIG. 1A is a schematic lateral cross-sectional depiction of a prior art gas turbine showing major components.

To the extent that an effective and balanced cooling fluid flow from the compressor provides adequate cooling, the additional capital and/or operational costs of utilizing or adding other cooling approaches is reduced or eliminated.

Notwithstanding the features of known diffuser flow-splitting approaches, when fluid from a compressor is desired to cool the transition, there is a need for an appropriately designed combination of fluid-flow-directing elements to attain a reliable, desired balancing of overall fluid flow efficiency and of transition cooling. As disclosed in the following sections, the present invention provides a fluid flow distributor comprising fluid-flow-directing flow splitters in a mid-section plenum that are effective to achieve this desired balance, toward providing a generally more efficient gas turbine engine. That is, the present invention advances the art by providing a solution to the dual, potentially conflicting issues of cooling of transitions and conservation of fluid flow pressure to the combustion chambers.

The present invention flows from an appreciation that design and performance optimization of single components in a complex system may not provide the overall optimum results. Following from this, and considering the possible uses of fluid flow from a gas turbine engine compressor, it was realized that diffuser efficiency may be sacrificed for the benefit of heat transfer across the exterior surface of the transitions, with the result of an overall greater benefit by reducing or eliminating the need for more costly cooling strategies. The sacrifice of one efficiency for the overall benefit goes against the generally accepted approach of diffuser design optimization. Nonetheless, this combining and balancing of operational endpoints has led to improved designs that provide a less-than-maximum diffuser efficiency that is more than offset to the positive by lower cost transition cooling. The embodiments of the present invention, disclosed below, were conceived and developed through consideration of such appreciation and balancing.

More specifically, the present invention balances the problems of cooling a gas turbine engine transition and providing fluid flow (i.e., air) to the combustion chambers' intakes by providing a fluid flow distributor comprising two or more flow-splitting members in the plenum. In some embodiments, these flow-spitting members (referred to herein also as "flow splitters") are positioned beyond the aft end of the annular diffuser, and each such flow-splitting member acts to serially partition the fluid flow into a more radially directed part and a generally axially directed part. In such embodiments, this may extend the effective diffusing zone as the fluid flow distributor directs some portion(s) of fluid flow more directly toward the combustion chambers' intakes, and also effectively spreads some portion(s) of fluid flow across the transition for cooling. An exemplary approach to an axial extension of a diffusing zone is providing three axially spaced apart annular flow splitters along an inboard annular wall of the plenum, wherein each flow splitter is spaced a respective desired distance away from the annular wall to provide for fluid flow there between. This results in multiple diffuser passages axially in the plenum. At each such flow splitter, some fluid is redirected radially outboard while other fluid continues axially downstream and substantially parallel to the annular wall of the plenum. This provides for extended controlled distribution of fluid flow beyond the aft end of the annular diffuser.

In some embodiments, such spaced apart flow splitters in the plenum also may be combined with a more upstream extending plenum. For example, a mid-frame section of a gas turbine engine is designed to provide a desired portion of the fluid flow from the compressor more directly to combustion chamber intakes and/or the leading edges of the transitions. This may direct some of that portion between the relatively wider gaps between adjacent transitions at their respective upstream intake ends. This may provide greater fluid flow efficiency (i.e., less frictional losses) and more distributed fluid flow for convective cooling.

And in other embodiments, where a relatively straight or narrowing channel is present instead of an annular diffuser comprising diverging walls (from upstream to aft ends), two or more axially spaced apart flow splitters in the plenum receive fluid flow from such channel during operation and function as a diffuser. In such embodiments, these may function collectively as the primary diffuser (i.e., converting dynamic pressure into static pressure) as they direct fluid flow in an apportioned manner, providing sufficient fluid flow across regions of the transitions to effectuate a desired cooling, while also providing a desired fluid flow more directly to the combustion chambers.

Accordingly, depending on the design objectives and components existing in the plenum of the mid-frame section, various embodiments may be effective to provide additional convective cooling, improved aerodynamic efficiency, or both.

Embodiments of the present invention are used in gas turbine engines such as are represented by FIG. 1A, which is a schematic lateral cross-sectional depiction of a prior art gas turbine 100 showing major components. Gas turbine engine 100 comprises a compressor 102 at a leading edge 103, a turbine 110 at a trailing edge 111 connected by shaft 112 to compressor 102, and a mid-frame section 105 disposed therebetween. The mid-frame section 105, defined in part by a casing 107 that encloses a plenum 106, comprises within the plenum 106 a combustion chamber 108 (such as a can-anular combustion chamber) and a transition 109. During operation, in axial flow series, compressor 102 takes in air and provides compressed air to an annular diffuser 104, which passes the compressed air to the plenum 106 through which the compressed air passes to the combustion chamber 108, which mixes the compressed air with fuel (not shown), providing combusted gases via the transition 109 to the turbine 110, whose rotation may be used to generate electricity. It is appreciated that the plenum 106 is an annular chamber that may hold a plurality of circumferentially spaced apart combustions chambers, each associated with a downstream transition. Likewise the annular diffuser 104 extends annularly about the shaft 112. It is noted that the aft portion of the annular diffuser 104 is considered herein to be part of the mid-frame section 105.

Figure 1B:
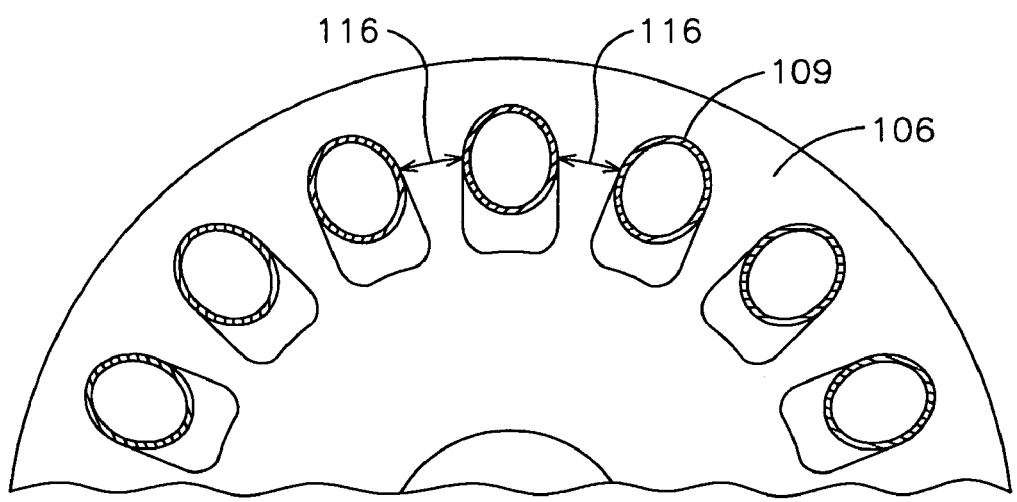
FIG. 1B is a cross-sectional depiction of a plenum of FIG. 1A, and disposition of transitions therein, taken along the 1B-1B axis.

That is, in a typical design a plurality of combustion chambers 108 and respective transitions 109 are disposed radially about an axis defined by shaft 112. FIG. 1B provides a cross-sectional depiction of a portion of the plenum 106 that depicts an arrangement of transitions 109 therein. The view is in accordance with line 1B-1B of FIG. 1A. Given the upstream-to-downstream angle of the combustion chamber 108 and transition 109 in FIG. 1A, and the radial arrangement as shown in FIG. 1B, it is appreciated that a gap 116 between adjacent transitions 109 is relatively smaller at the trailing edge of the transitions 109 and relatively wider at the leading edge of the combustion chambers 108. Also, it is noted that the annular diffuser 104 in a typical prior art gas turbine engine disperses fluid into the plenum 106 such that the fluid is directed substantially against a particular region of the respective transition 109, so that during operation there is a relatively high variance across the transition with respect to both velocity and heat transfer coefficient.

Figure 2:
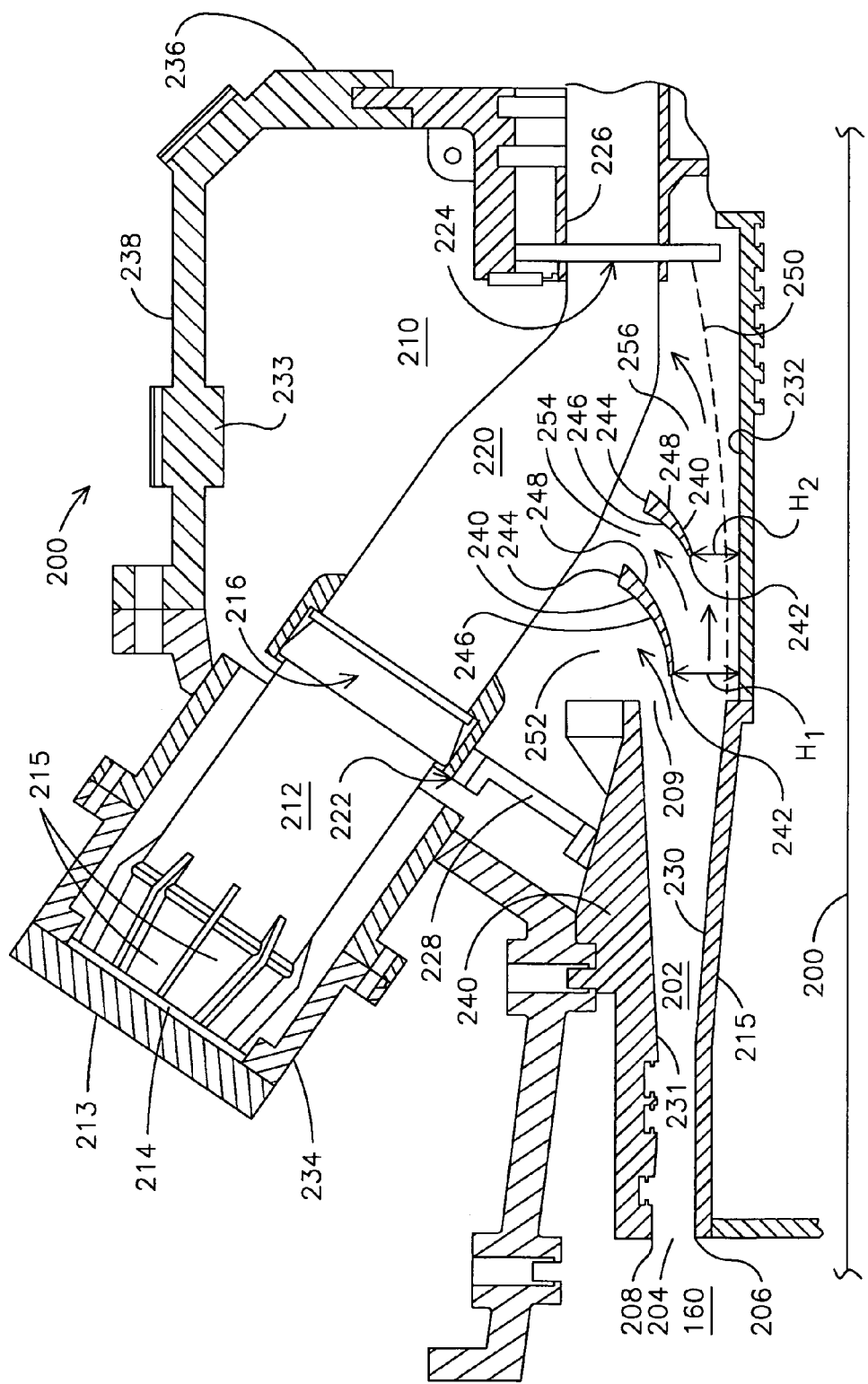
FIG. 2 provides an axial cross-section view of an annular diffuser and a mid-frame section of a gas turbine engine, depicting one embodiment of the invention.

FIG. 2 is a lateral cross-sectional view of a mid-frame section 200 of a gas turbine engine similar to that depicted in FIG. 1A but that includes one embodiment of the present invention. FIG. 2 also depicts components in communication with the mid-frame section 200, such as a trailing edge 160 of a compressor (not shown in entirety) and a forward portion (i.e., upstream of the number "202") of an annular diffuser 202 communicating with the trailing edge 160, and, at the other end of the mid-frame section 200, an inlet 226 of a turbine (also not shown in entirety). Thus, as depicted in FIG. 2, the mid-frame section 200 is comprised of a plenum 210, defined by a casing 233 and an inboard annular wall 232, and a combustion chamber 212 coupled to a transition 220 disposed therein. The following description of components and their respective arrangements is meant to be instructive, but is not meant to be limiting of the scope of the claims.

The trailing edge 160 of the compressor communicates with the annular diffuser 202 at an annular diffuser inlet 204 defined by an inboard edge 206 and an outboard edge 208. The annular diffuser 202 is a structure defined to the inboard side by an inboard annular wall 230 and to the outboard side by an outboard annular wall 231. The inboard annular wall 230 and the outboard annular wall 231 diverge for about the last half of the length of the annular diffuser 230, which ends at an aft end 209, coinciding with the aft end 241 of outboard annular wall 231. The diffuser 202 communicates with the plenum 210. This divergence contributes to the functioning of the annular diffuser 202 by converting velocity head to pressure head.

The plenum 210 is a confined space defined by the inboard annular wall 232 disposed radially inboard and a casing 233 further defined positionally by a forward structure 234, an aft structure 236, and an outboard structure 238. In plenum 210 is positioned the combustion chamber 212 (attached to a nozzle block 213, fuel nozzles and nozzle assemblies not shown) comprising an intake end 214, comprising a plurality of entry spaces 215 for fluid flow into the combustion chamber 212, and an outlet end 216. In communication with the combustion chamber outlet 216 is the transition 220. Transition 220 comprises a leading edge 222 and a trailing edge 224; the latter is in communication with the inlet 226 of the turbine (not shown). A bracing structure 228 supports the junction of the combustion chamber outlet 216 and the transition leading edge 222. During gas turbine operation, fluid flow from the diffuser 202 passes through the plenum 210 and in to the combustion chamber intake 214, and also passes across the transition 220 effectuating a convective cooling. As discussed above, the plenum 210 is an annular space typically in which are disposed a plurality combustion chambers, connected in parallel with respect to a fluid flow from the annular diffuser during operation, in communication with a plurality of transitions each respectively coupled to one of said combustion chambers, for directing the fluid flow to a respective turbine inlet opening.

As depicted in FIG. 2, two axially spaced apart annular flow splitters 240 are provided along the annular wall 232 aft of annular diffuser 202. Each such flow splitter 240 is disposed a respective desired height, $H_1$ and $H_2$, outboard and away from the annular wall 232 to provide for substantially axial fluid flow between the respective flow splitter 240 and the annular wall 232. The flow splitters 240 each comprise a leading edge 242, a trailing edge 244, an upstream surface 246, and a downstream surface 248. The trailing edge 244 of each flow splitter 240 is spaced a distance from the transition 220 to provide for fluid flow, and is not closely matched nor disposed a small distance from the transition 220. While not meant to be limiting, in FIG. 2 the flow splitters 240 are depicted as axially spaced apart so the trailing edge 244 of the more upstream flow splitter 240 does not overlap in the axial direction with a leading edge 242 of the more downstream flow splitter 240. However, in other embodiments there may be overlap of adjacent flow splitters (see FIG. 3 for one example). As to FIG. 2, at each such elevated annular flow splitter 240, some fluid (shown by arrows) is directed radially and outboard while other fluid continues downstream parallel to the annular wall 232. The overall effect provides for extended distribution of fluid flow after the aft end 209 of the annular diffuser 202. Also, in various embodiments, the annular flow splitters are designed, with regard to the mid-frame section and its components, to provide an additional diffusion effect of the fluid flow. This is based on effectuating a design in which the overall effect of passage of fluid flow through passages (i.e., through passages 252, 254 and 256) is to convert a relatively higher velocity, relatively lower pressure fluid flow, such as fluid flow at the end of the diffuser, into a yet lower velocity, higher pressure fluid flow. Each annular flow splitter 240 is supported at desired intervals, as by struts (not shown) or other structural supports (not shown) as are known to those skilled in the art.

With regard to "annular wall" or "inboard annular wall," these terms are considered synonymous and are taken to mean any annular structure that defines the inboard boundary surface along which fluid from the compressor flows in the plenum. This provides a surface inboard of annular flow splitters, helping to define a space for fluid flow by providing an inboard boundary. Thus, the use of the annular structural member as depicted in FIG. 2 to be an annular wall, identified as 232, is not meant to be limiting. For example, a non-structural inboard annular plate (depicted as a dashed line 250) may extend from the diffuser intake and be positioned atop the structural member. In such case the inboard annular plate 250 would comprise the annular wall with respect to the flow splitters, as this inboard annular plate 250 forms a relevant inboard boundary for fluid flow. Generally, such inboard annular plate may have any curvature or deviation from a more interior, structural annular component as is desired for fluid flow distribution in consideration of the particular arrangement of spaced apart annular flow splitters employed with it. Structural support for such inboard annular plate may be provided by any approach known to those skilled in the art.

With regard to the term "substantially axial" as it is applied to fluid flow in a plenum of a mid-frame section of a gas turbine engine, this is taken to mean that the movement of such fluid flow, which generally progresses along the inboard annular wall, has a movement defined by a vector that is horizontal, or generally horizontal, or within about 25 degrees from horizontal, taking the shaft 112 in FIG. 1A to define the horizontal axis.

When two or more flow splitters are disposed as described for FIG. 2, in the plenum downstream of the aft end of an annular diffuser, the two or more flow splitters effectively form an extended diffuser outlet in the plenum, extending the effective outlet of the annular diffuser from the original single outlet (such as at aft end 209). That is, the annular diffuser's aft end outlet is extended to comprise a plurality of outlets formed in part by the trailing edges of the respective flow splitters. For example, in FIG. 2, there are outlets 252, 254, and 256.

Figure 3:
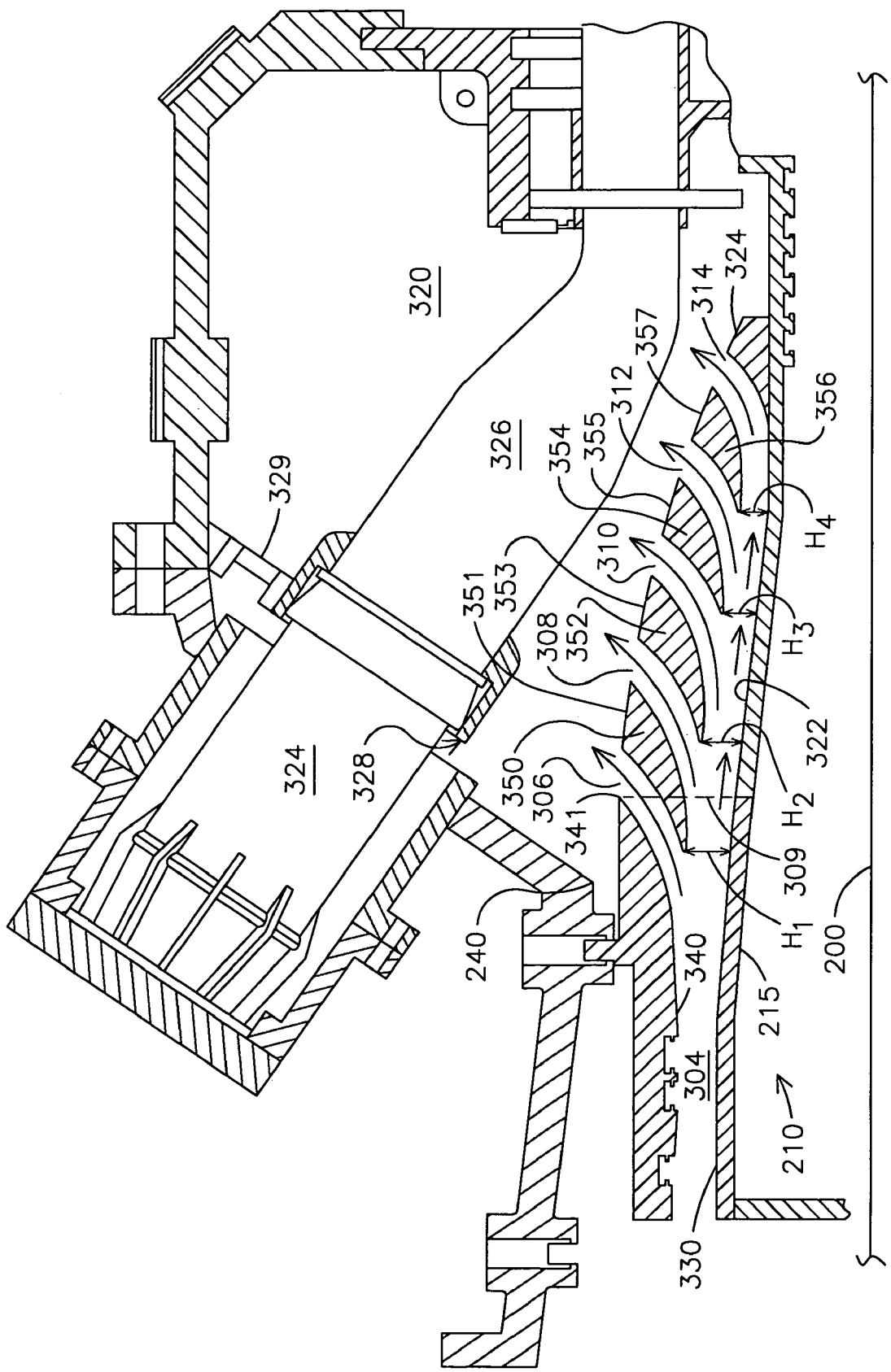
FIG. 3 provides an axial cross-section view of an annular diffuser and a mid-frame section of a gas turbine engine, depicting a second embodiment of the invention.

An extended diffuser outlet, providing multiple axially disposed outlets, also may be combined with a more upstream extending plenum. One embodiment of this is depicted in FIG. 3, which illustrates a mid-frame section redesign that increases the capacity to direct a desired portion of the fluid flow from the compressor more directly to combustion chamber intakes. This also benefits from a greater percentage of fluid from the compressor being released into the plenum closer to the wider gaps between adjacent transitions that are farther upstream, toward the combustion chambers.

More particularly, in FIG. 3 is provided a shortened annular diffuser channel 304, ending at a more upstream (relative to FIG. 2) aft end 309 aligned with the aft end 341 of an outboard annular wall 340 (which with an inboard annular wall 330 define the annular diffuser channel 304). A first flow splitter 350 partly resides within (i.e., upstream of the aft end 309 of) the annular diffuser channel 304, and more substantially resides within a plenum 320. The first flow splitter 350 partitions fluid flow outwardly through a first outlet 306, into plenum 320, and axially between the first flow splitter 350 and an inboard annular wall 322 (fluid flows indicted by arrows).

Fluid flowing through first outlet 306 enters the plenum more upstream relative to the diffuser channel 202 in FIG. 2. Specifically, in the embodiment as depicted in FIG. 3, the first outlet 306 is positioned more upstream than a forward end 328 of a transition 326 positioned in the plenum 320, and is positioned radially inward of a combustion chamber 324 in the plenum 320. That is, in FIG. 3 the first outlet 306 is disposed radially inward the combustion chamber 324, whereas in FIG. 2 the aft end 209 is disposed radially inward from the transition 220. Such more upstream annular diffuser aft end 209 is achieved by a redesign of structural elements that had restricted the upstream movement of the aft end (compare 306 and 209); in particular, the bracing structure 228 in FIG. 2 is removed and a radially outward support 329 is provided where the combustion chamber 324 and transition 326 are coupled.

Spaced from and arranged axially along inboard annular wall 322 are a second flow splitter 352, a third flow splitter 354, and a fourth flow splitter 356. Similarly to the discussion of the embodiment of FIG. 2, these flow splitters 352, 354, and 356 respectively direct portions of the fluid flow radially outward, through outlets 308, 310, and 312 to provide a desired level and distribution of fluid along the transition 326. While not meant to be limiting, a more aft outlet 314 is formed between fourth flow splitter 356 and a raised member, 324, positioned along inboard annular wall 322. Such raised member 324 need not be provided in every embodiment. Thus, more generally, each annular flow splitter is spaced from the annular wall by a respective height (depicted as $H_1$ to $H_4$), the respective height effective to partition a radial respective portion of fluid flow, directed radially along the upstream surface of the respective annular flow splitter, from an axial respective portion of fluid flow continuing substantially axially. Also, the respective upstream surfaces 351, 353, 355, and 357 of each flow splitter 350, 352, 354 and 356 are spaced a distance from the transition 326 to provide a substantial space for fluid flow, and these upstream surfaces 351, 353, 355, and 357 are neither closely matched nor disposed a small distance from either the transition 320 nor from the combustion chamber 324.

Accordingly, a plenum, such as 320, comprising two or more flow splitters disposed therein and communicating with a shortened annular diffuser channel, such as 304, may be provided such that the most upstream outlet (e.g., 306 in FIG. 3, i.e., between the aft end of the diffuser outward wall and the most upstream flow splitter), is positioned radially inward of the more upstream half of a combustion chamber (not shown), or is positioned axially inward of the more downstream half of a combustion chamber disposed in the plenum (shown in FIG. 3). Also, it is appreciated that the forward end of the most upstream flow splitter need not enter the annular diffuser channel, but rather may be spaced more downstream than is depicted in FIG. 3. This may provide a relatively wider first outlet than is depicted in FIG. 3.

In other embodiments, there may be an annular passageway from a compressor to a plenum, wherein the interior and exterior walls are not diverging, so there is no diffusion effect, so that such passageway does not function as an annular diffuser. In such embodiments, two or more axially disposed flow splitters may be positioned in the plenum, spaced from the inboard annular wall and inboard the transitions. These two or more flow splitters may then comprise a multi-port diffuser independently of an upstream annular diffuser.

Figure 4:
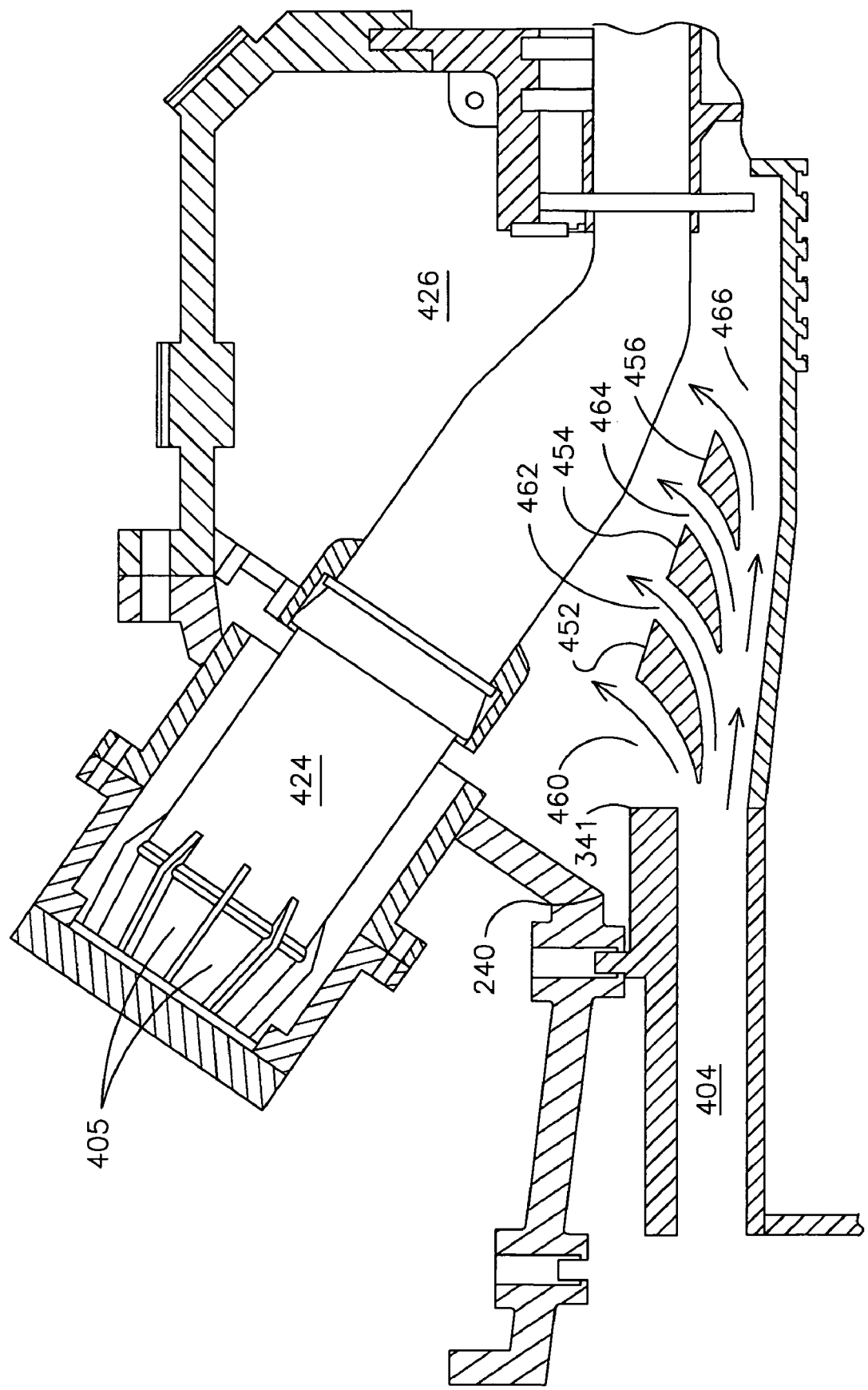
FIG. 4 provides an axial cross-section view of a mid-frame section of a gas turbine engine, depicting an embodiment of the invention in a plenum that receives fluid from the compressor that is passed through a channel rather than an annular diffuser.

FIG. 4 provides a depiction of one such embodiment of the present invention, providing a series of flow splitters 450, 452 and 454 disposed in a plenum 420, which is in fluid communication with a passageway 404 that is not diverging, and that does not function as a diffuser. The passageway has parallel opposing walls (though by not diverging the passageway walls alternatively may be tapering together from inlet to aft end). This results in the multiple plenum passageways 460, 462, 464 and 466, defined as shown by flow splitters 450, 452, and 454 (and adjacent structures laterally) providing the primary diffusion function, albeit as multiple diffusers that distribute some fluid flow (indicated by arrows) across a transition 426 for cooling as well as some fluid (indicated by arrows) more closely and directly to a plurality of entry spaces 415 of a combustion chamber 424.

Figure 5:
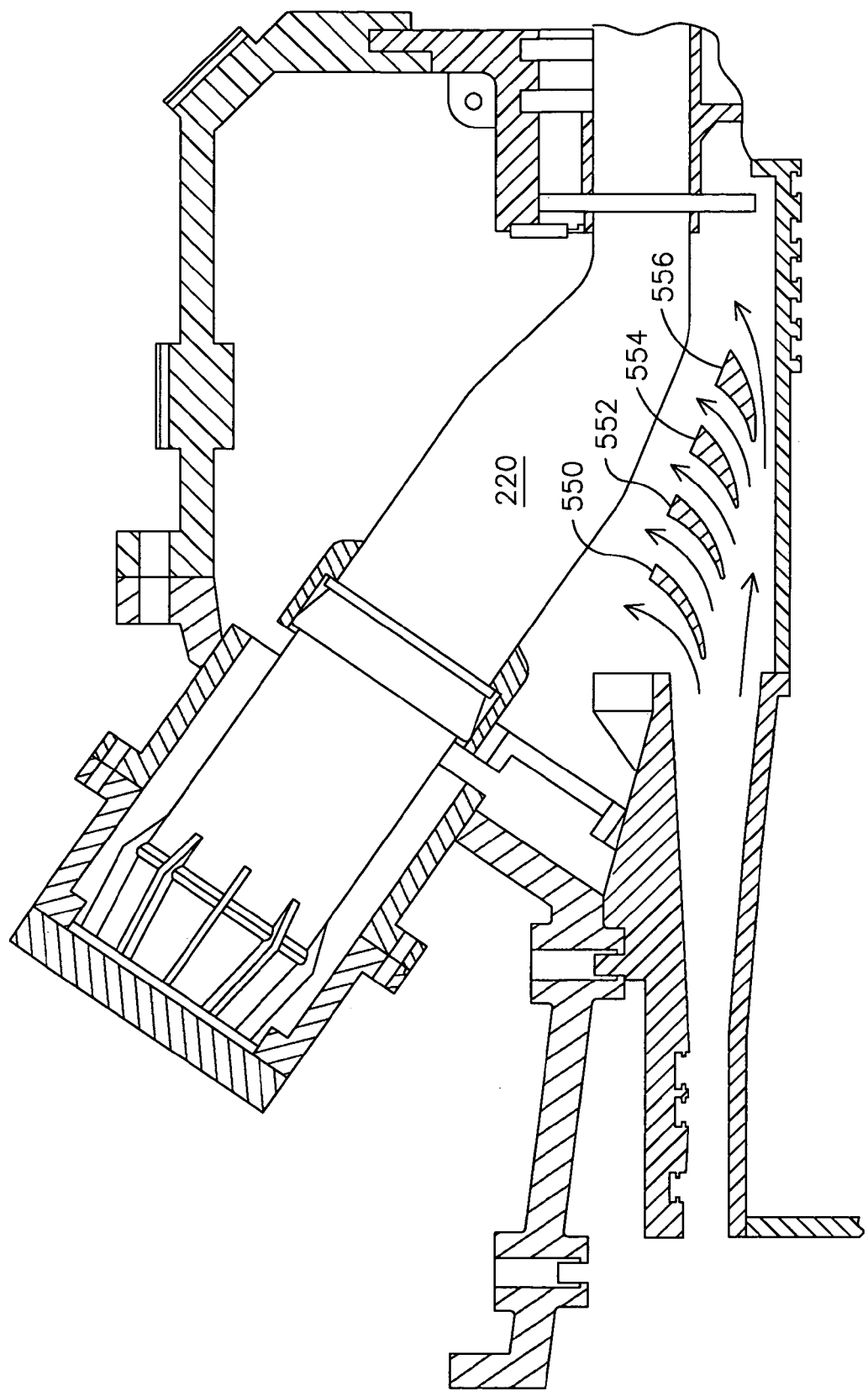
FIG. 5 provides an axial cross-section view of an annular diffuser and a mid-frame section of a gas turbine engine, depicting another embodiment of the invention.

FIG. 5 provides a depiction of another embodiment of the present invention, providing a first flow splitter 550 not disposed partly within an annular diffuser channel 504, and further comprising axially spaced apart additional flow splitters 552, 554 and 556. All such flow splitters 550, 552, 554 and 556 overlap axially.

The cross-sectional shapes provided in the above figures are meant to be exemplary and not limiting. A flow splitter as utilized in a plenum in accordance to the present invention may comprise any combination of a curved or linear upstream surface, and a curved or linear downstream surface.

Further to the latter point, it is appreciated that in some embodiments one or more flow splitters may have varying cross-sectional profiles, such as by modifying the height and/or angle, so that relatively more fluid is directed into relatively wider gaps between transitions at their more leading edges. For example, a most upstream-positioned flow splitter in a plenum may be constructed so as to have a longer profile (extending more radially outward) and/or a more radially upstream angle in regions that are radially inward of a gap. In contrast, in regions that are radially inward of a transition, the profile may be shorter, more spaced apart from an inboard annular wall, and/or angled more toward the trailing edge of the plenum, so as to provide more air for cooling the transition. Thus, one or more flow splitters may comprise circumferentially varying, such as undulating, profiles to provide for differential fluid flow management, such as between versus beneath transitions, such as when there is an interest in passing more fluid between the relatively wider gaps between transitions toward the leading edge of the mid-frame section. This may result in some embodiments comprising wavy profiles of one or more flow splitters as portions of these annular components (each of which may be comprised on one or a plurality of sections assembled together) are positioned axially inboard of such gaps and transitions.

It is noted that although the embodiments above depict two or more flow splitters disposed axially in a plenum, another embodiment of the invention comprises a gas turbine engine that comprises one flow splitter in its plenum, wherein a leading edge of that flow splitter is downstream of an annular diffuser, and the flow splitter is positioned to direct air to two different vectors relative to a transition in the plenum. This may be envisioned, for example, by considering FIG. 5 with flow splitter 552 but without flow splitters 550, 554 and 556.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

I claim as my invention:

1. A mid-frame section of a gas turbine engine comprising:
   a plenum, in fluid communication with an aft end of an annular diffuser, the plenum comprising a confined annular space defined exteriorly by a casing and inboardly by an annular wall and in which are disposed a plurality of combustion chambers, connected in parallel with respect to a fluid flow from the annular diffuser during operation, and a plurality of transitions each respectively coupled to one of said combustion chambers, for directing the fluid flow to a respective turbine inlet opening;

a first annular flow splitter comprising a leading edge, a trailing edge, an upstream surface and a downstream surface, and spaced from the annular wall by a first height, the first height effective to partition a first portion of the fluid flow directed with a radial component along the upstream surface of the first annular flow splitter from a second portion of fluid flow continuing substantially axially from the annular diffuser; and a second annular flow splitter, in the plenum, comprising a leading edge spaced aft of the annular diffuser aft end, a trailing edge, an upstream surface and a downstream surface, and spaced from the annular wall by a second height, the second height effective to partition the second portion into a third portion of fluid flow directed with a radial component along the upstream surface of the second annular flow splitter from a fourth portion of fluid flow continuing substantially axially, wherein the first and the second annular flow splitters are configured to provide a diffusion effect beyond that of the annular diffuser.

2. The mid-frame section of claim 1, wherein the first annular flow splitter is downstream of the annular diffuser aft end.

3. The mid-frame section of claim 1, wherein the aft end of the annular diffuser is disposed axially upstream of the plurality of transitions.

4. The mid-frame section of claim 1, wherein the leading edge of the second annular flow splitter does not overlap axially with the trailing edge of the first annular flow splitter.

5. The mid-frame section of claim 1, wherein the leading edge of the second annular flow splitter overlaps axially with the trailing edge of the first annular flow splitter.

6. The mid-frame section of claim 1 wherein the leading edge of the first flow splitter is aft the annular diffuser aft end.

7. The mid-frame section of claim 1 wherein the leading edge of the first flow splitter is upstream the annular diffuser aft end.

8. The mid-frame section of claim 1, additionally comprising one or more additional annular flow splitters spaced apart from and aft of the second annular flow splitter, each said additional annular flow splitter spaced from the annular wall by a respective height, the respective height effective to partition a respective portion of fluid flow directed radially along an upstream surface of the respective additional annular flow splitter from a respective axial portion of fluid flow continuing substantially axially.

9. A gas turbine engine comprising the mid-frame section of claim 1.

10. A gas turbine engine mid-frame section comprising a plenum defined exteriorly by a casing and interiorly by an annular wall and in which are disposed a plurality of combustion chambers connected in parallel with respect to fluid flow from a compressor, a plurality of transitions each respectively coupled to one of said combustion chambers, and a fluid flow distributor receiving the fluid flow into the plenum from the compressor and comprising:

a first annular flow splitter comprising a leading edge, a trailing edge, an upstream surface and a downstream surface, and spaced from the annular wall by a first height, the first height effective to partition a first portion of the fluid flow, directed with a radial component along the upstream surface of the first annular flow splitter, from a second portion of fluid flow continuing substantially axially; and a second annular flow splitter spaced a distance aft from the first annular flow splitter, comprising a leading edge, a trailing edge, an upstream surface and a downstream surface, and spaced from the annular wall by a second height, the second height effective to partition the second portion into a third portion of fluid flow, directed with a radial component along the upstream surface of the second annular flow splitter, from a fourth portion of fluid flow continuing substantially axially, wherein the first and the second annular flow splitters are configured to provide a diffusion effect, and the leading edge of the second annular flow splitter is arranged in the plenum.

11. The mid-section frame of claim 10, wherein the fluid flow distributor receives the fluid flow from the compressor via a passageway that does not comprise diverging opposing walls.

12. The mid-section frame of claim 10, wherein the fluid flow distributor receives the fluid flow from an annular diffuser comprising an inlet end and an aft end.

13. The mid-frame section of claim 12 wherein the leading edge of the first flow splitter is upstream the annular diffuser aft end.

14. The mid-frame section of claim 10, wherein the aft end of the annular diffuser is disposed axially upstream of the plurality of transitions.

15. The mid-section frame of claim 10, wherein the leading edge of the second annular flow splitter does not overlap with the trailing edge of the first annular flow splitter.

16. The mid-section frame of claim 10, wherein the leading edge of the second annular flow splitter overlaps with the trailing edge of the first annular flow splitter.

17. The mid-section frame of claim 10, additionally comprising a third annular flow splitter spaced a distance alt from the second annular flow splitter, comprising a leading edge, a trailing edge, an upstream surface and a downstream surface, and spaced from the annular wall by a third height, the third height effective to partition the fourth portion into a fifth portion of fluid flow, directed radially along the upstream surface of the second annular flow splitter, from a sixth portion of fluid flow continuing substantially axially.

18. A gas turbine engine comprising the mid-frame section of claim 10.

* * * * *